United States Patent
Zeppenfeld et al.

(10) Patent No.: US 12,321,453 B1
(45) Date of Patent: *Jun. 3, 2025

(54) MACHINE LEARNING-BASED MALICIOUS ATTACHMENT DETECTOR

(71) Applicant: CLOUDFLARE, INC., San Francisco, CA (US)

(72) Inventors: Torsten Zeppenfeld, Emerald Hills, CA (US); Javier Castro, Kensington, MD (US); YenHsiang Chang, Hayward, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 17/409,648

(22) Filed: Aug. 23, 2021

Related U.S. Application Data (63) Continuation-in-part of application No. 16/231,838, filed on Dec. 24, 2018, now Pat. No. 11,556,644.

(51) Int. Cl.
  *G06F 21/56* (2013.01)
  *G06F 18/243* (2023.01)
  (Continued)

(52) U.S. Cl.
  CPC ...... *G06F 21/566* (2013.01); *G06F 18/24323* (2023.01); *G06F 21/554* (2013.01); *G06F 21/568* (2013.01); *G06N 3/08* (2013.01)

(58) Field of Classification Search
  CPC ............. G06F 21/566; G06F 18/24323; G06F 21/554; G06F 21/568; G06N 3/08
  See application file for complete search history.

(56) References Cited

U.S. PATENT DOCUMENTS

| | | |
|---|---|---|
| 2014/0090061 A1 | 3/2014 | Avasarala et al. |
| 2015/0230108 A1* | 8/2015 | Sridhara ............... G06F 21/552 455/26.1 |

(Continued)

FOREIGN PATENT DOCUMENTS

| | | | |
|---|---|---|---|
| GB | 2555859 A * | 5/2018 | ............. G06F 21/56 |
| GB | 2557253 A | 6/2018 | |

(Continued)

OTHER PUBLICATIONS

Nor Zakiah Gorment; Ali Selamat; Lim Kok Cheng; Ondrej Krejcar; "Machine Learning Algorithm for Malware Detection: Taxonomy, Current Challenges, and Future Directions"; IEEE Access; Year: Mar. 14, 2023; vol. 11; Journal Article; Publisher: IEEE; pp. 141045-141089 (Year: 2023).*

(Continued)

*Primary Examiner* — Fatoumata Traore
*Assistant Examiner* — Courtney D Fields
(74) *Attorney, Agent, or Firm* — NICHOLSON DE VOS WEBSTER & ELLIOTT LLP (57) ABSTRACT

A method includes receiving, from a pre-processor, an output file, the output file having been created by the pre-processor in response to input of an electronic file to the pre-processor, the electronic file being an attachment to an electronic mail message that is in-transit to a recipient computer on a network, the electronic file being a spreadsheet file, the output file containing features that are created by the pre-processor; receiving, from a machine learning-based classifier, malware classification data, the malware classification data being output by the machine learning-based classifier in response to the machine learning-based classifier determining whether the features are indicators of obfuscation, the data used to create the machine learning-based classifier including output files previously created by (Continued)

the pre-processor; in response to the malware classification data matching a criterion, causing the network to modify, delay, or block transmission of the electronic file to the recipient computer.

19 Claims, 5 Drawing Sheets

(51) Int. Cl.
*G06F 21/55* (2013.01)
*G06N 3/08* (2023.01)
*G06F 12/14* (2006.01)
*G06F 21/52* (2013.01)
*H04L 29/06* (2006.01)

(56) References Cited

U.S. PATENT DOCUMENTS

| | | |
|---|---|---|
| 2017/0262633 A1 | 9/2017 | Miserendino et al. |
| 2018/0159871 A1 | 6/2018 | Komashinskiy et al. |
| 2019/0065744 A1* | 2/2019 | Gaustad ............... G06F 21/562 |
| 2019/0332769 A1* | 10/2019 | Fralick ................... H04L 9/30 |

FOREIGN PATENT DOCUMENTS

| | | |
|---|---|---|
| WO | 2019/075338 A1 | 4/2019 |
| WO | 2019/168703 A1 | 9/2019 |

OTHER PUBLICATIONS

Decalage, "oletools—Python Tools to Analyze OLE and MS Office Files", https://www.decalage.info/python/oletools, dated Jun. 13, 2018, 4 pages.

Final Office Action, U.S. Appl. No. 16/231,838, Mar. 11, 2022, 13 pages.

Maryam Al-Janabi; Ahmad Mousa Altamimi; "A Comparative Analysis of Machine Learning Techniques for Classification and Detection of Malware"; 2020 21st International Arab Conference on Information Technology (ACIT); Year: Mar. 2020 | Conference Paper | Publisher: IEEE; pp. 1-9 (Year: 2020).

Non-Final Office Action, U.S. Appl. No. 16/231,838, Nov. 4, 2021, 11 pages.

Non-Final Office Action, U.S. Appl. No. 18/155,486, Apr. 19, 2024, 40 pages.

Notice of Allowance, U.S. Appl. No. 16/231,838, Sep. 14, 2022, 15 pages.

Titaniumcore, "Malware Analysis Solution", https://www.reversinglabs.com/technology/malware-analysis-solution, last viewed on Apr. 1, 2019, 5 pages.

Giovanni Apruzzese, Hyrum S. Anderson, Savino Dambra, David Freeman, Fabio Pierazzi, Kevin Roundy; "Real Attackers Don't Compute Gradients: Bridging the Gap Between Adversarial ML Research and Practice"; 2023 IEEE Conference on Secure and Trustworthy Machine Learning; Jan. 2023; IEEE; pp. 339-364 (Year: 2023).

Notice of Allowance, U.S. Appl. No. 18/155,486, Sep. 16, 2024, 15 pages.

* cited by examiner

MACHINE LEARNING-BASED MALICIOUS ATTACHMENT DETECTOR

BENEFIT CLAIM

This application claims the benefit as a continuation-in-part under 35 U.S.C. § 120 of application Ser. No. 16/231,838, filed 24 Dec. 2018, the entire contents of which is incorporated herein by reference for all purposes as if fully set forth herein.

TECHNICAL FIELD

One technical field of the present disclosure is computer security. Another technical field of this disclosure is prevention of malware attacks that use documents attached to electronic messages. Another technical field of this disclosure is machine learning-based classification of documents that are attached to electronic communications on a computer network.

BACKGROUND

Computer networks facilitate the communication of electronic messages from sender computers to recipient computers. Malware is frequently propagated via electronic messages. Network applications have attempted to protect recipient computers and networks from malware attacks. However, the purveyors of malware have continued to find ways to circumvent the protective measures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The appended claims may serve as a summary of the invention.

DETAILED DESCRIPTION

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments.

General Overview

Malware often tricks users into divulging personal or business confidential information by appearing to be a legitimate communication. Distinguishing malware from a legitimate message is increasingly challenging as malware attempts continue to become more sophisticated.

Simple malware detection techniques analyze easily identifiable elements of an electronic message, such as the sender's domain and hyperlinks embedded in the message body. These existing approaches do not work when more advanced obfuscation techniques are used to hide or disguise the malware to avoid detection. For example, if the malware is not contained in the message but rather is part of a document that is attached to the message, simple approaches that focus on the message itself cannot detect the malware.

Existing approaches that do analyze message attachments commonly use sandboxing to open attachments and execute any embedded code in a highly controlled execution environment, such that if malware is present, it is not propagated and the rest of the messaging system is not negatively affected. A disadvantage of sandboxing approaches is that potential malware must be executed in order to determine whether the attachment is safe. This testing process can be time consuming. Thus, sandboxing approaches are not well-suited for messaging environments in which transmission delays are often unacceptable.

The increasingly complex forms of malware are not amenable to rule-based detection because obfuscation techniques are constantly changing. Continuous maintenance and updating of malware detection rule sets quickly becomes unwieldy and is not feasible from a computational standpoint. User confidence in the messaging system degrades when rule-based techniques fail to adapt to new obfuscation techniques and a security or privacy breach results.

In this disclosure, technologies are described for addressing ongoing challenges of accurately and reliably detecting suspicious message attachments, and preemptively handling those message attachments while maintaining the operational requirements of a messaging system.

To address these challenges, the disclosed technologies include a machine learning-based model that is trained to recognize, and learns over time, combinations and patterns of features of electronic documents that are strong malware signals. In an embodiment, a pre-processor performs a static analysis of a document that is a message attachment. The machine learning-based model analyzes features that are output by the pre-processor.

The machine learning-based model outputs malware classification data, which includes a prediction as to whether any combination or pattern of the features produced by the pre-processor indicates that the document contains malware. In an embodiment, malware classification data produced by the machine learning-based model is used to improve the security of a recipient computer, other downstream computers, and/or the network. In an embodiment, the malware classification data is used to modify, delay or block transmission of the document to a recipient computer.

In some implementations, the pre-processor creates the features that are used by the machine learning-based model by analyzing sub-features of the document. In an embodiment, a sub-feature is a raw feature, such as a word or a character contained in the document, and a feature is a data value that is derived from or computed based on the sub-feature, such as a statistic. Occurrence count, ratio and frequency are examples of features that may be created by the pre-processor based on raw features of the document. Other examples of features that may be created and output by the pre-processor include entropy measurements, parse tree data, and warning messages.

The configuration of machine learning technology that is described in this disclosure has been shown to significantly improve a computer's ability to detect advanced obfuscation techniques. As a result, the disclosed technologies have demonstrated an ability to recognize malware attacks that had been undetected by pure rule-based malware detection systems.

Another advantage of the disclosed approach is that the machine learning-based model configured as described herein can adapt and generalize over time so as to recognize previously unseen obfuscation techniques as they are presented, without requiring an analyst to continuously update or re-configure a complicated malware detection rule set. Yet another advantage of the disclosed approach is that it does not need to use sandboxing in order to examine message attachments for malware.

While this disclosure describes the invention in the context of a message attachment use case, aspects of the disclosed technologies are equally useful in other applications, such as any application that may benefit from machine learning-based classification of an electronic file, whether or not the file is a message attachment. Other embodiments, features and aspects will become apparent from the disclosure as a whole.

Throughout this disclosure, an element that is identified by a noun followed by the letter s in parentheses, as in(s), indicates that one or more of the element may be used in various embodiments.

Computing System Overview

Figure 1:
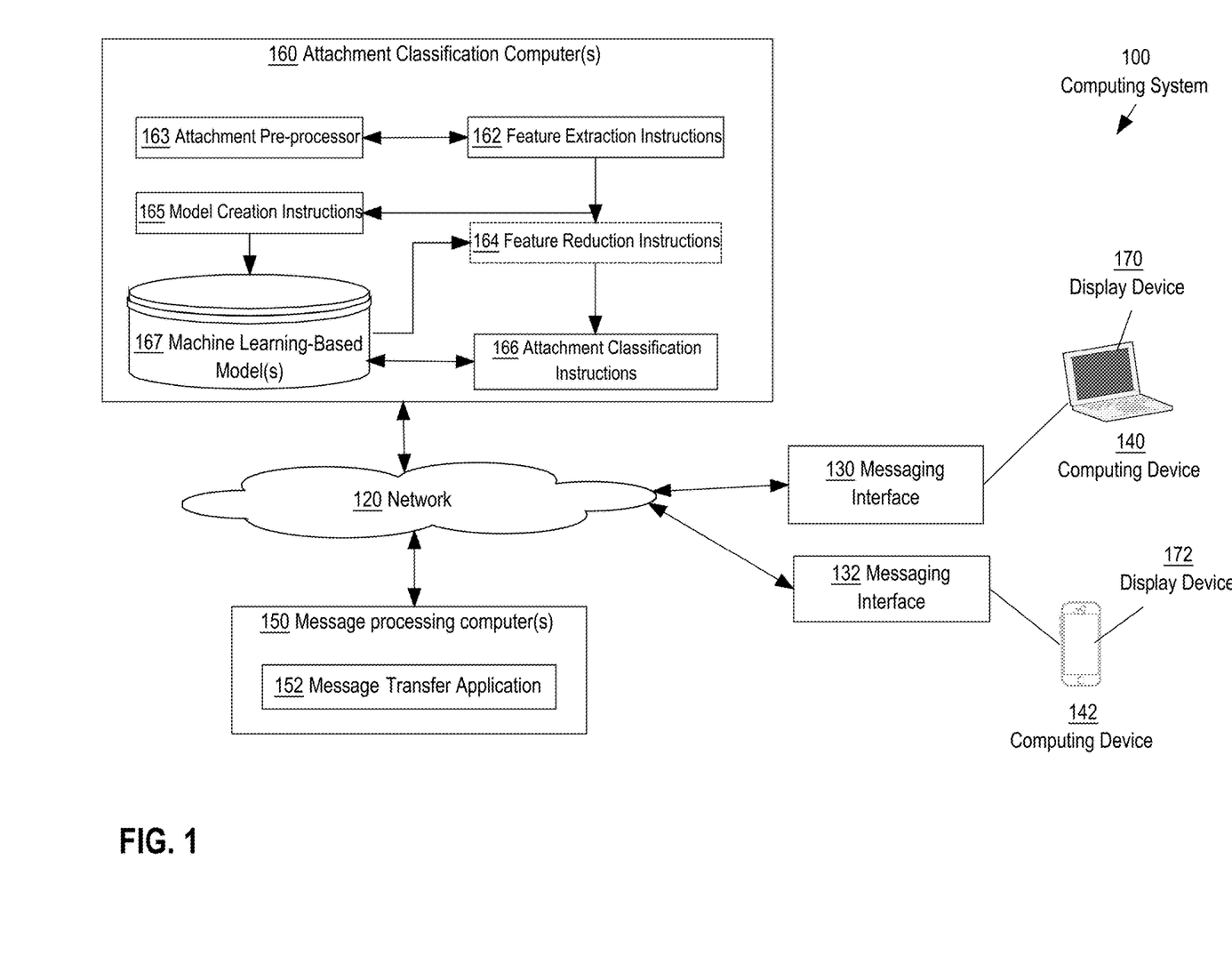
FIG. 1 is a block diagram that depicts an example networked computing system, in an embodiment.

FIG. 1 is a block diagram that depicts an example computing system 100 arranged to operate messaging interfaces 130, 132, message processing computer(s) 150, and attachment classification computer(s) 160, in the transmission of electronic messages from sender computers to recipient computers, such as computing devices 140, 142, over an electronic communications network 120, in an embodiment. Attachment classification computer(s) 160, computing devices 140, 142, and message processing computer(s) 150 are communicatively coupled to the electronic communications network 120. Display devices 170, 172 are communicatively coupled to computing devices 140, 142, respectively.

Implemented in the computing devices 110, 140, 142, 150 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as feature extraction instruction(s) 162, feature reduction instructions 164, attachment classification instruction(s) 166, machine learning-based model(s) 167, messaging interfaces 130, 132, and message transfer application 152, which are described in detail below.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations of rules or transformations of other data representing images, graphical elements or text; in all cases, a model is capable of computer execution or evaluation to generate output specifying a class, type or other characterization of an input or a set of inputs.

Although computing system 100 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computer(s) 150, 160 are each a server-side computing device such as a server computer or a cluster or network of server computers accessible by the Internet, for example in a public or private cloud. As illustrated in FIG. 1, each of display devices 170, 172 is implemented as part of a computing device 140, 142, respectively, but may be implemented as a separate device or as part of another device, or as multiple networked display devices, in other implementations.

Messaging interfaces 130, 132 are each client-side messaging software such as a mail client or a messaging application, which reside in memory of computing devices 140, 142, respectively. Malware attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 5:
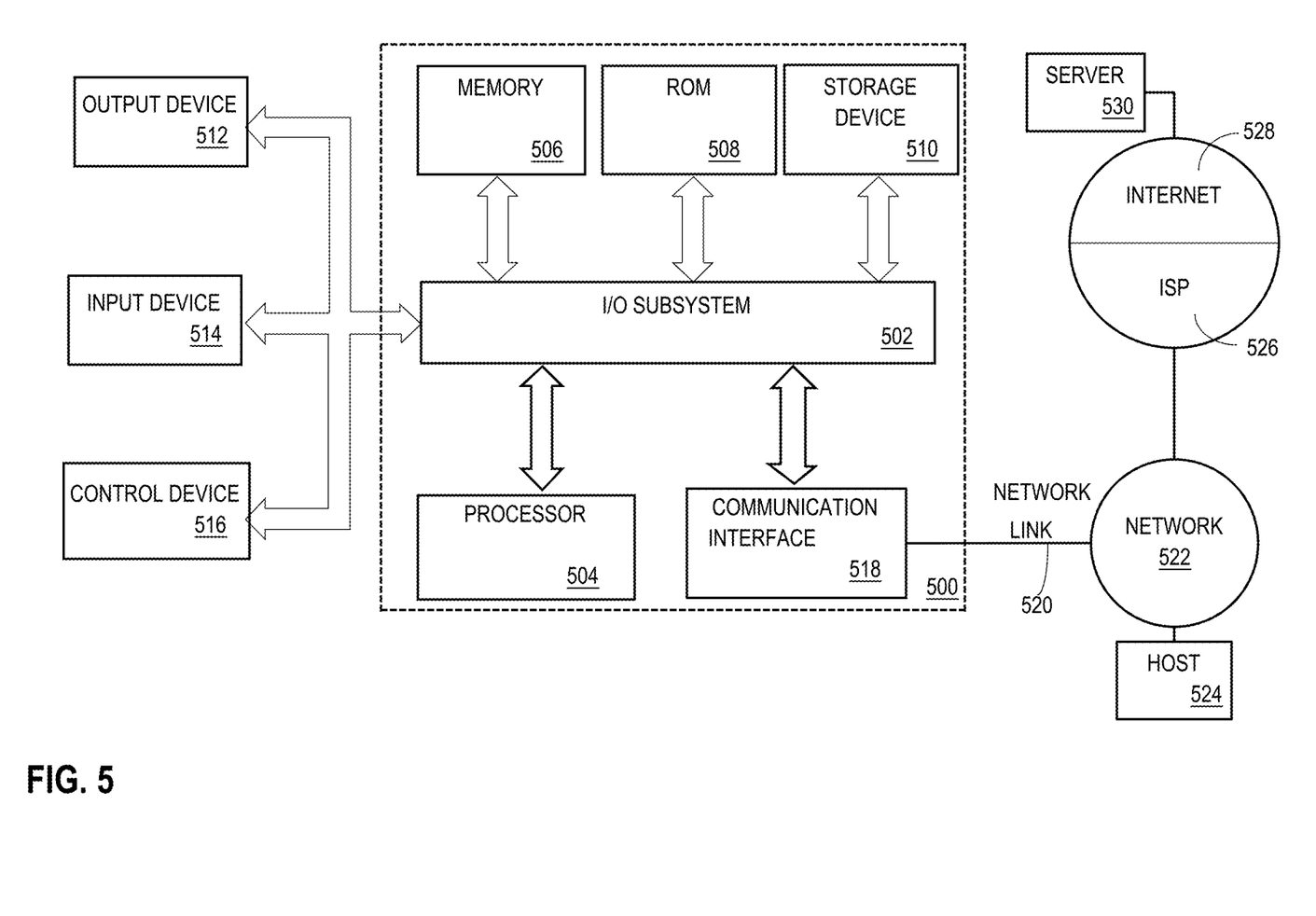
FIG. 5 is a block diagram that illustrates a computer system upon which an embodiment of the present invention may be implemented.

Messaging interfaces 130, 132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices 110, 140, 142, 150 are shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142, 150.

Message Processing

Message processing computer(s) 150 operate message transfer application 152. Message transfer application 152 when executed by a processor controls the transmission of electronic communications between sender computers and recipient computers, such as computing devices 140, 142, on the network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Portions of message transfer application may be implemented in an online service, such as a social network service, in which electronic messages may include notifications, recommendations, shares, comments, news feeds, and/or connection requests. Message transfer application 152 may include various message scanning and filtering technologies, such as virus scanners, intrusion detection systems, and/or spam filters.

In an embodiment, message transfer application 152 employs stateless security scanning to scan messages as they are in transit from a sending computer to one or more recipient computers. When the message scanner detects a message that contains an attachment, the attachment document, an electronic file, is processed by attachment classification computer(s) 160 as described below.

After the message attachment is processed by attachment classification computer(s) 160, message transfer application 152 receives malware classification output from attachment classification computer(s) 160 and determines, based on the malware classification data, whether to modify, delay, block, or continue transmitting the message attachment to a recipient computer. In an embodiment, message transfer application 152 executes a rule to map the malware classification data to an appropriate network instruction using, for example, a mapping table, and then causes the network instruction that corresponds to the malware classification data to be implemented on network 120.

The network instruction output by message transfer application 152 in response to malware classification data produced by attachment classification computer(s) 160 can include a network command to modify, delay, block, or continue transmitting a message attachment or the message that contains the attachment. An instruction to modify a message attachment may include an instruction to re-direct or quarantine the message containing the attachment, for example by routing the message to a honeynet.

Attachment Pre-Processor

Attachment pre-processor 163 analyzes an electronic file, such as a message attachment received from message processing computer(s) 150, and produces an output file that contains features that are extracted or derived from the electronic file. In an embodiment, pre-processor 163 produces the output file without executing any code that may be embedded in the electronic file. Thus, pre-processor 163 can process the electronic file without using sandboxing.

In various embodiments, attachment pre-processor 163 performs any one or more of the following to create the output file: parsing the electronic file, pre-execution static analysis of the electronic file, extracting script components from the electronic file. Examples of software used as pre-processors in some embodiments include open source libraries such as TIKA (available from The Apache Foundation), PyRTF (available on SourceForge from oubiwann and scusack), POI (available from The Apache Foundation), OLETOOLS (available on GitHub from Philippe Lagadec), or any open source or commercial software product that provides parsing and metadata extraction of electronic document formats such as VBA, DOCX, RTF, and PDF. Pre-processor 163 identifies sub-features of the electronic file and creates an output file that includes features that are used by machine learning-based model(s) 167 to produce malware classification data for the electronic file.

The particular sub-features identified by pre-processor 163 in the electronic file received from message processing computer(s) 150 may vary depending on the document type and/or characteristics of the electronic file. Examples of sub-features of the electronic file include any one or more of the following: a word, 128-byte data, a comment line, a line of code, a script, a page, a character, an edit, a version number, an image, a video, a color, a string of interest, an embedded object, an object identifier, a trailer object, a stream, an end of file (EOF) indicator, a variable, an xref tag, a startxref tag, a Uniform Resource Locators (URL), a metadata item, a version number, a file size, a decompiler message, a line of text.

The particular features created and included in the output file produced by pre-processor 163 may vary depending on the document type and/or characteristics of the electronic file. For example, the output file produced by pre-processor 163 may include different features depending on whether the electronic file is a word processing document, such as a MICROSOFT WORD file or a spreadsheet, such as a MICROSOFT EXCEL document or a presentation, such as a MICROSOFT POWERPOINT document, whether the electronic file is saved in a particular format, such as Rich Text Format (RTF) or Portable Document Format (PDF), whether the electronic file contains visual basic code or executable scripts or other programming code, such as ADOBE FLASH Small Web Format (SWF) ACTIONSCRIPT files, or whether the electronic file contains a Uniform Resource Locator (URL) link or a digital image. Pre-processor 163 may determine the file type, contents, and/or format based on the file extension and/or file metadata.

Feature Extraction

Feature extraction instructions 162 when executed by a processor cause attachment pre-processor 163 to process the electronic file received from message processing computer(s) 150. In an embodiment, feature extraction instructions 162 include an Application Programming Interface (API) call to pre-processor 163 which identifies the electronic file to attachment pre-processor 163 and returns the output file produced by attachment pre-processor 163.

Examples of features that may be included by attachment pre-processor 163 in the output file in accordance with feature extraction instructions 162 include any one or more of the following: an occurrence count, an occurrence frequency, metadata, a string of interest, a warning, a classification, a rule name.

In one embodiment where the output file indicates that the electronic file contains Visual Basic for Application (VBA) code or programming code, the features included in the output file include any one or more of the following: a word count, a 128-byte frequency, a 128 byte raw-count, a count of comment lines, a ratio of number of comment lines to code lines, a number of code lines, a length of document in characters, a count of VBA scripts, an average number of lines per VBA script, a largest number of lines per VBA script.

In one embodiment where the output file indicates that the electronic file is a Rich Text Format (RTF) file or a word processor-created document file that does not contain programming code, the features included in the output file include any one or more of the following: a page count, a word count, a character count, an editing time, a classification, a warning, a text entropy, an overall entropy, a document size, parse tree data, a rule name, an indicator priority, an indicator category.

In one embodiment where the output file indicates that the electronic file is a Portable Document Format (PDF) file or an image file, the features included in the output file include any one or more of the following: a version number, a number of colors, an occurrence count for a string of interest, a count of embedded objects, a minimum object identifier, a maximum object identifier, a trailer minimum size, a trailer maximum size, a count of trailer objects, a count of streams, a stream minimum size, a stream maximum size, a fraction of a file that is part of a stream, a total entropy, a non-stream entropy, a file size in bytes, a file size in bytes for non-stream parts, an end of file (EOF) count, a count for a top occurring variable, a count of xref tags, a count of startxref tags, a count of embedded Uniform Resource Locators (URLs), a top occurring metadata item.

In one embodiment where the output file indicates that the electronic file is a Portable Document Format (PDF) file, the machine learning-based model is created using a neural network and the malware classification data is produced by inputting a single image of the electronic file to the machine learning-based classifier.

In one embodiment where the output file indicates that the electronic file is a Flash file or a Small Web Format (SWF) file or a multimedia file, the features included in the output file include any one or more of the following: a version number, a file size, a count of scripts, a count for a word of interest, a decompiler message, a line count, a character count, a 128 byte frequency, a 128 byte raw-count.

In one embodiment, where the output file indicates that the electronic file is a spreadsheet document, e.g., a MICROSOFT EXCEL *.XLSM format file, feature extraction instructions 162 of an XLSM-specific model are programmed to cause the features included in the output file to include any one or more of the following: sheet count, word count from all cells, character count from all words in all cells, editing time, text entropy from all text in all cells, overall entropy from all text in all cells and all field types, occurrence count for strings of interest, occurrence count for field types of interest. In an embodiment, the design and implementation of XLSM file processing capability is implemented as previously described; in general, a "shredder" component that all of the models share transforms the specified file format into constituent elements of text and document structure information, a feature extractor finds the above-mentioned features, and then a classifier outputs an indication of malicious content.

Model Creation

In an embodiment, attachment classification computer(s) 160 include a single machine learning-based model 167. For example, attachment classification computer(s) 160 may include individual models 167 that are separately trained to recognize malware signals for different specific document types or document characteristics. Alternatively or in addition, attachment classification computer(s) 160 may include one or more generalized models that are trained to recognize malware signals that are common across multiple different document types and/or document characteristics.

Machine learning-based model(s) 167 are created by model creation instructions 165 processing training data using machine learning algorithm(s). In various embodiments, the machine learning-based model(s) 167 are created using as training data set(s) of output files that have been previously produced by attachment pre-processor 163. A particular training data set includes output files that are representative of one or more document types and/or document characteristics.

Thus, in an embodiment, machine learning-based model(s) 167 can be trained without reading or analyzing the actual electronic documents themselves that are analyzed by pre-processor 163. Therefore, machine learning-based model(s) 167 can be trained without executing any code that may be embedded in those documents. Rather, as disclosed herein, model(s) 167 can be trained by simply reading the output files that are produced by pre-processor 163 and applying the machine learning algorithm(s) to those output files.

In various embodiments, the machine learning-based model(s) 167 are created by evaluating training data using any one or more of the following: a tree-based algorithm, a random forest algorithm, a deep learning algorithm, a neural network, a deep convolutional neural network. The particular type of machine learning algorithm that is used to train the model(s) 167 may vary depending on the document type or a document characteristic. "Algorithm" as used herein may refer to a set of computer instructions in which steps of a mathematical algorithm are implemented.

For example, in an embodiment, a machine learning-based model 167 is created using a random forest algorithm in which multiple decision trees evaluate and vote on multiple different features produced by attachment pre-processor 163 as a result of attachment pre-processor 163 processing a document. If a decision tree concludes that a feature is a strong indicator of obfuscation, the decision tree produces a higher vote. If the decision tree concludes that a feature is not a strong indicator of obfuscation, the decision tree produces a lower vote. The votes of all of the decision trees are aggregated to produce a final malware classification for the document. In another embodiment, machine learning-based model 167 is created using a neural network, such as a deep convolutional neural network (DCNN) that is trained using image files that contain embedded clickable URLs.

In general, data sets used to generate the output files that are used to train machine learning-based model(s) 167 include both positive and negative examples, that is, examples of benign documents and examples of malicious documents. In some embodiments, the ratio of malicious documents to benign documents is less than 1, meaning the training data set contains more benign documents than malicious documents. In other embodiments, the ratio of malicious documents to benign documents is equal to 1, meaning that the training data set contains equal numbers of malicious and benign documents. In still other embodiments, the ratio of malicious documents to benign documents is greater to 1, meaning that the training data set contains more malicious than benign documents.

Feature Reduction

In an embodiment, feature reduction instructions 164 implement a mathematical algorithm that reduces the features contained in the output file produced by pre-processor 163 to a smaller number of features. For example, features that contain similar information may be combined or merged using mutual information criteria.

In an embodiment, machine learning-based model(s) 167 may be used to inform feature reduction instructions 164 of features that are strong indicators of malware or obfuscation.

In response, feature reduction instructions 164 may filter out features that are not strong indicators of malware or obfuscation.

Thus, feature reduction instructions 164 produce a subset of the features contained in the output file produced by pre-processor 163, in an embodiment. Alternatively or in addition to reducing the feature set, feature reduction instructions 164 transform feature set, that is the original set of features contained in the output file or the reduced set of features, to a vector, such as a floating point vector. The feature set output produced either by feature extraction instructions 162 or feature reduction instructions 164 is exposed or otherwise made available to attachment classification instructions 166 for classification using machine learning-based model(s) 167.

Attachment Classification

In an embodiment, attachment classification instructions 166 and machine learning-based model(s) 167 are collectively referred to as a machine learning-based classifier. Embodiments of attachment classification computer(s) 160 include a single classifier or multiple classifiers. Attachment classification instructions 166 provide the output file produced by pre-processor 163 as optionally modified by feature reduction instructions 164 to machine learning based models 167, which produce the malware classification data as described herein. Attachment classification instructions 166 expose or otherwise make available the malware classification data for use by message processing computer(s) 150 and message transfer application 152 using, for example, an API.

Example Messaging System Architecture

Figure 2:
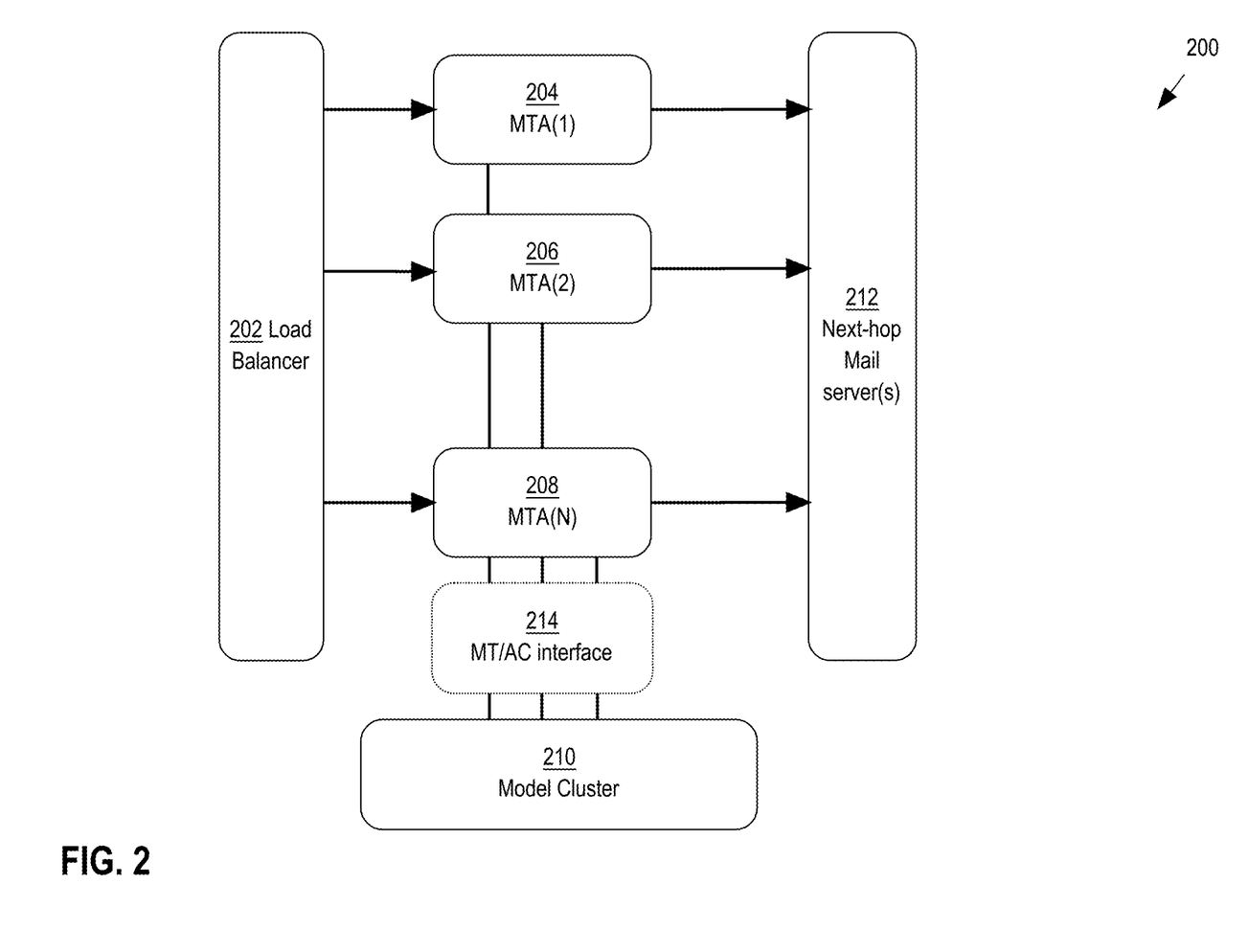
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 performs stateless security scanning of messages received from network device 202 and prior to transmission of the messages to network device 212.

In an embodiment, MT/AC interface 214 is interposed between the MTAs 204, 206, 208 and a model cluster 210. However, portions of MT/AC interface 214 may be implemented within an MTA 204, 206, 208.

Model cluster 210 may be implemented on attachment classification computer(s) 160 and include one or more machine learning-based model(s) 167 that may be selectively engaged and disengaged by MT/AC interface 214 for use in connection with the stateless scanning performed by the MTAs 204, 206, 208. In an embodiment, model cluster 210 includes machine learning-based model(s) 167 for many different document types, such as any one or more of the document types discussed herein. In an embodiment, the attachment classification computer(s) 160 used to host model cluster 210 are stateless model servers.

Message processing/attachment classification (MT/AC) interface 214 when executed by a processor controls the selective engagement of attachment classification computer(s) 160 by message processing computer(s) 150 in tasks performed by, or requested by, message transfer application 152. MT/AC interface 214 manages and facilitates electronic communications of data and instructions between message processing computer(s) 150 and attachment classification computer(s) 160 during the handling by message transfer application 152 of electronic messages and their respective attachments, for example messages that are being transmitted from computing device 140 to computing device 142, or from computing device 142 to computing device 140, over network 120. MT/AC interface 214 is shown as a separate component in FIG. 2 but all or portions of MT/AC interface 214 may be implemented as part of message transfer application 152. Alternatively, or in addition, some portions of MT/AC interface 214 may be implemented on attachment classification computer(s) 160.

In an embodiment, MT/AC interface 214 includes at least feature extraction instruction(s) 162, feature reduction instructions 164, attachment classification instruction(s) 166. In executing one or more of feature extraction instruction(s) 162, feature reduction instructions 164, attachment classification instruction(s) 166, MT/AC interface 214 accesses and utilizes data and instructions stored in machine learning-based model(s) 167 as described herein.

Attachment Classification Process

Figure 3:
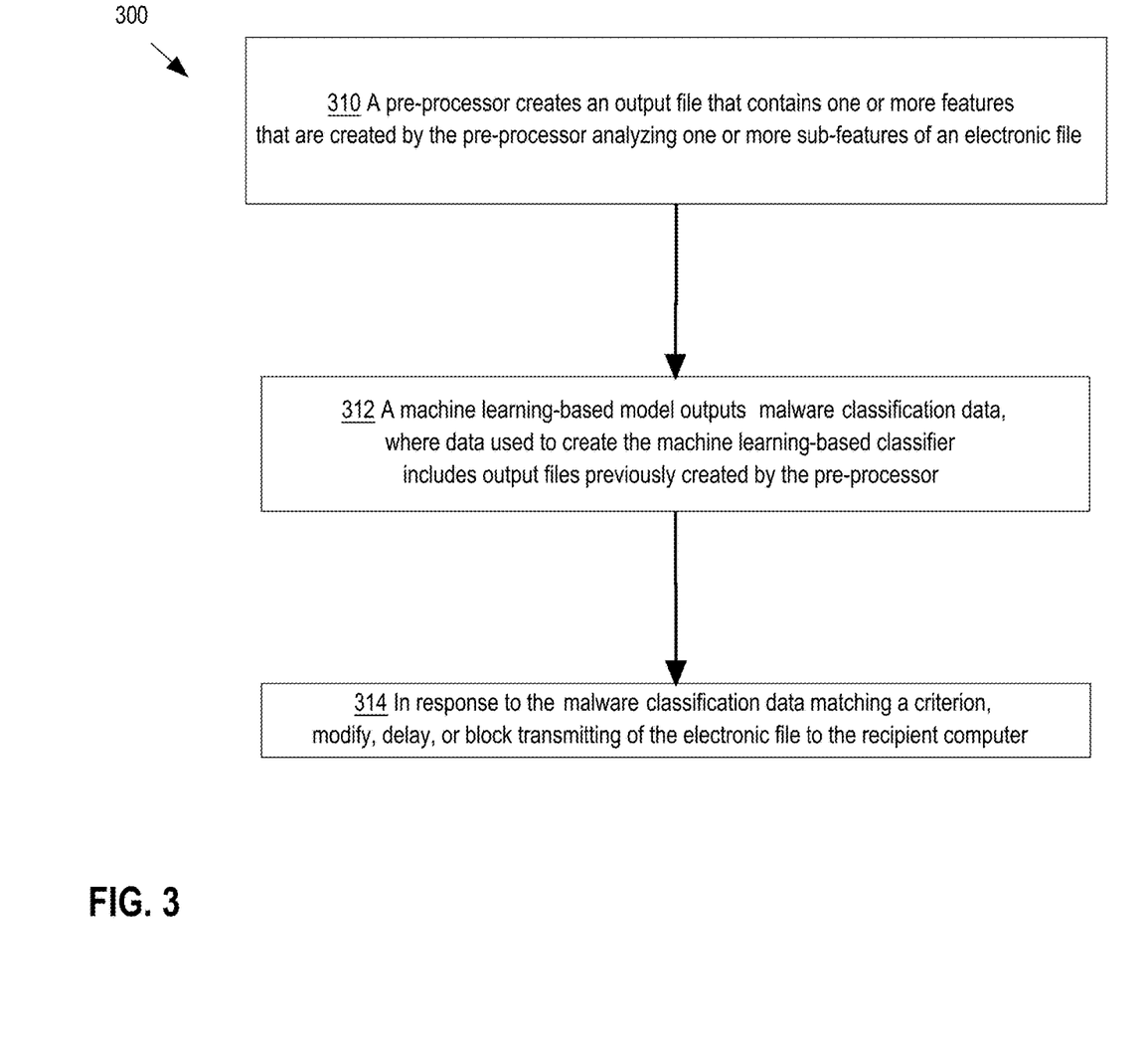
FIG. 3 is a flow diagram that depicts a process, in an embodiment.

In an embodiment, the above-described technologies are used to automatically and proactively scan electronic messages prior to delivery of the messages to a recipient computer. To that end, FIG. 3 illustrates a process that can be performed by computing system 100. FIG. 3 is a flow diagram that depicts a process 300 for selectively incorporating machine learning technologies into a message scanning process, in an embodiment. Process 300 may be performed by a single entity or program or by multiple entities or programs, including, for example, a client-side mail or messaging application and a server. The operations of the process as shown in FIG. 3 can be implemented using processor-executable instructions that are stored in computer memory. For purposes of providing a clear example, the operations of FIG. 3 are described as performed by various computing device(s) 110, 140, 142, 150, which may be individually or collectively referred to as simply 'computing system 100.'

In operation 310, process 300 creates an output file that contains one or more features that are created by the pre-processor analyzing one or more sub-features of an electronic file. From the perspective of a machine learning-based classifier or a message transfer application, the output file is received from the pre-processor over a network. In an embodiment, the output file is created by the pre-processor in response to input of an electronic file to the pre-processor. The electronic file is an attachment to a message that is in-transit to a recipient computer on a network, in an embodiment. The output file contains features that are created by the pre-processor analyzing one or more sub-features of the electronic file.

In operation 312, process 300 outputs malware classification data, where data used to create the machine learning-based classifier includes output files previously created by the pre-processor. For the perspective of a message transfer application or a network application, for example, malware classification data is received from a machine learning-based classifier. The malware classification data indicates whether the electronic file does or does not contain malware. The malware classification data is output by the machine learning-based classifier in response to the machine learning-based classifier determining that the features are or are not indicators of obfuscation. Data used to create the machine learning-based classifier includes output files previously created by the pre-processor.

In operation 314, process 300 causes the network to modify, delay, or block transmission of the electronic file to the recipient computer in response to the malware classification data matching a criterion. Examples of criteria that may be used to determine whether to cause the network to act on the malware classification data include a threshold confidence value and a threshold voting score. For instance, if a voting score and a confidence value produced by the machine learning-based classifier exceed the respective threshold values, process 300 causes the network to act on the malware classification data, in an embodiment.

Use Case: Identifying a Suspicious Document

Figure 4:
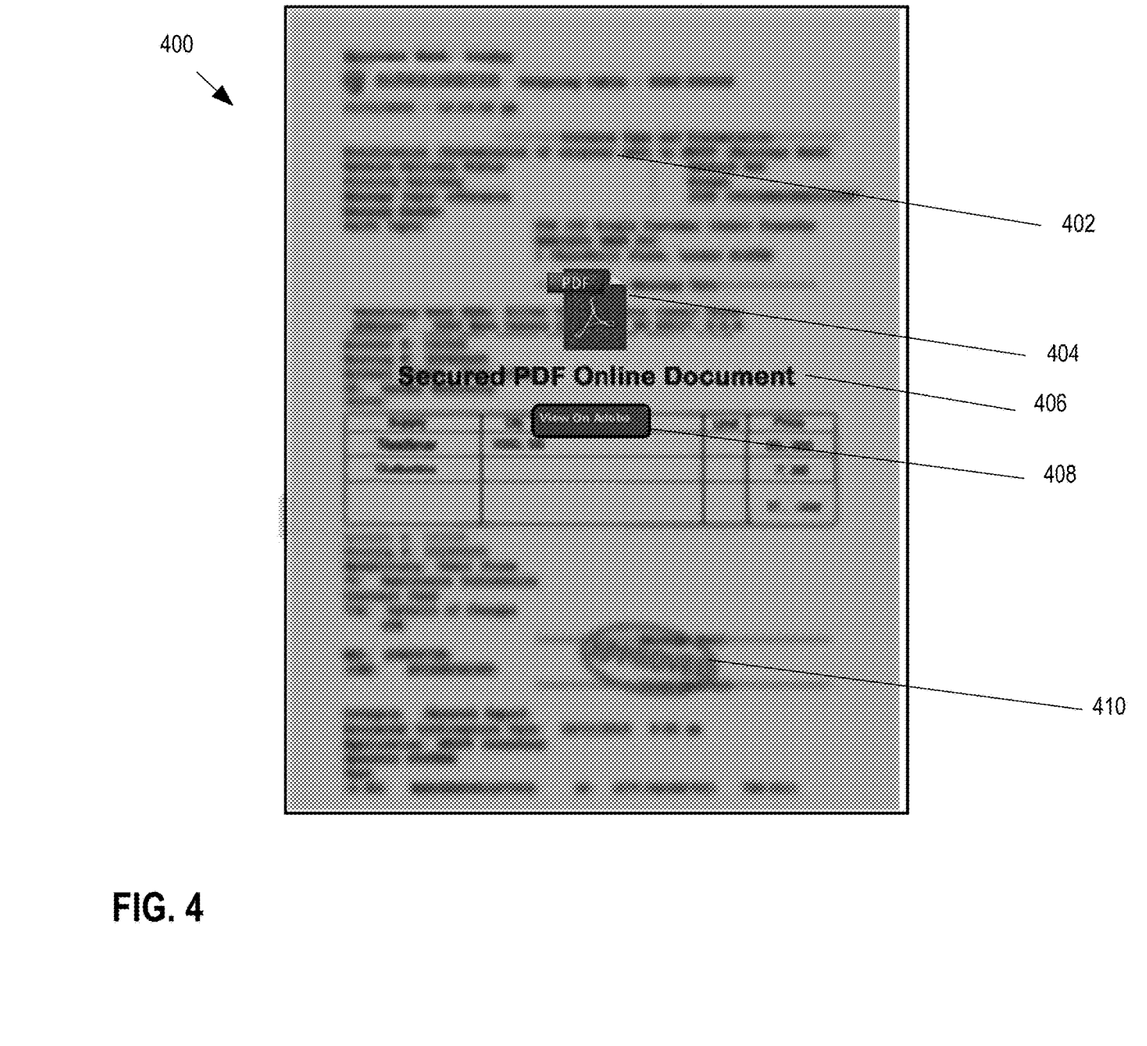
FIG. 4 is a screen capture of an example of a document that may be identified by the disclosed technologies as malicious, in an embodiment.

FIG. 4 is a screen capture of an example of a document 400 that may be identified by the disclosed technologies as malicious, in an embodiment. Features of document 400 that may be used by the machine learning-based classifier to produce malware classification data include blurred text 402, graphical icon 404, text 406, and clickable link 408. The features 402, 404, 406, 408 are extracted from document 400 by a pre-processor. The pre-processor additionally creates computed or derived features, in an embodiment. The computed or derived features may include, for example, a count of the number of blurred words, a percentage of document 400 that is blurred, a percentage of document 400 that is in color, a count of the number of colors in document 400, a count of embedded URLs that are not on a whitelist. The machine learning-based classifier produces malware classification data based on the extent to which combinations or patterns of these and/or other features of document 400 correspond to strong indicators of obfuscation or malware. For example, a percentage of blurred text exceeding a threshold combined with a count of embedded clickable URLs exceeding another threshold may be a strong indicator of obfuscation that causes the machine learning-based classifier to classify document 400 as malicious.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a computer-implemented method includes receiving, from a pre-processor, an output file; where the output file is created by the pre-processor in response to input of an electronic file to the pre-processor; where the electronic file is an attachment to a message that is in-transit to a recipient computer on a network; where the output file contains features that are created by the pre-processor analyzing one or more sub-features of the electronic file; receiving, from a machine learning-based classifier, malware classification data that indicates whether the electronic file does or does not contain malware; where the malware classification data is output by the machine learning-based classifier in response to the machine learning-based classifier determining that the features are or are not indicators of obfuscation; where data used to create the machine learning-based classifier includes output files previously created by the pre-processor; in response to the malware classification data matching a criterion, causing the network to modify, delay, or block transmission of the electronic file to the recipient computer.

An example 2 includes the subject matter of example 1, where the pre-processor performs any one or more of the following to create the output file: parsing the electronic file, pre-execution static analysis of the electronic file, extracting script components from the electronic file. An example 3 includes the subject matter of example 1 or example 2, where the features includes any one or more of the following: an occurrence count, an occurrence frequency, metadata, a string of interest, a warning, a classification, a rule name. An example 4 includes the subject matter of any of examples 1-3, where the one or more sub-features of the electronic file includes any one or more of the following: a word, 128-byte data, a comment line, a line of code, a script, a page, a character, an edit, a version number, an image, a video, a color, a string of interest, an embedded object, an object identifier, a trailer object, a stream, an end of file (EOF) indicator, a variable, an xref tag, a startxref tag, a Uniform Resource Locators (URL), a metadata item, a version number, a file size, a decompiler message, a line of text. An example 5 includes the subject matter of any of examples 1-4, including any one or more of the following: reducing the features using mutual information criteria, transforming the features to a floating point vector. An example 6 includes the subject matter of any of examples 1-5, where a model used by the machine learning-based classifier is created using any one or more of the following: a tree-based algorithm, a random forest algorithm, a deep learning algorithm, a neural network, a deep convolutional neural network. An example 7 includes the subject matter of any of examples 1-6, where the output file indicates that the electronic file contains Visual Basic for Application (VBA) code or programming code, and the features includes any one or more of the following: a word count, a 128-byte frequency, a 128 byte raw-count, a count of comment lines, a ratio of number of comment lines to code lines, a number of code lines, a length of document in characters, a count of VBA scripts, an average number of lines per VBA script, a largest number of lines per VBA script. An example 8 includes the subject matter of any of examples 1-7, where the output file indicates that the electronic file is a Rich Text Format (RTF) file or a word processor-created document file that does not contain programming code, and the features includes any one or more of the following: a page count, a word count, a character count, an editing time, a classification, a warning, a text entropy, an overall entropy, a document size, parse tree data, a rule name, an indicator priority, an indicator category. An example 9 includes the subject matter of any of examples 1-8, where the output file indicates that the electronic file is a Portable Document Format (PDF) file or an image file, and the features includes any one or more of the following: a version number, a number of colors, an occurrence count for a string of interest, a count of embedded objects, a minimum object identifier, a maximum object identifier, a trailer minimum size, a trailer maximum size, a count of trailer objects, a count of streams, a stream minimum size, a stream maximum size, a fraction of a file that is part of a stream, a total entropy, a non-stream entropy, a file size in bytes, a file size in bytes for non-stream parts, an end of file (EOF) count, a count for a top occurring variable, a count of xref tags, a count of startxref tags, a count of embedded Uniform Resource Locators (URLs), a top occurring metadata item. An example 10 includes the subject matter of any of examples 1-9, where the output file indicates that the electronic file is a Portable Document Format (PDF) file and the machine learning-based classifier is created using a neural network and the malware classification data is produced by inputting a single image of the electronic file to the machine learning-based classifier. An example 11 includes the subject matter of any of examples 1-10, where the output file indicates that the electronic file is a Flash file or a Small Web Format (SWF) file or a multimedia file, and the features includes any one or more of the following: a version number, a file size, a count of scripts, a count for a word of interest, a decompiler message, a line count, a character count, a 128 byte frequency, a 128 byte raw-count. An example 12 includes the subject matter of any of examples 1-11, including receiving the electronic file from a message transfer application on the network.

In an example 13, a computer program product includes one or more non-transitory computer-readable storage media including instructions which, when executed by one or more processors, cause the one or more processors to perform operations including: receiving, from a pre-processor, an output file; where the output file is created by the pre-processor in response to input of an electronic file to the pre-processor; where the electronic file is an attachment to a message that is in-transit to a recipient computer on a network; where the output file contains features that are created by the pre-processor analyzing one or more sub-features of the electronic file; receiving, from a machine learning-based classifier, malware classification data that indicates whether the electronic file does or does not contain malware; where the malware classification data is output by the machine learning-based classifier in response to the machine learning-based classifier determining that the features are or are not indicators of obfuscation; where data used to create the machine learning-based classifier includes output files previously created by the pre-processor; in response to the malware classification data matching a criterion, causing the network to modify, delay, or block transmission of the electronic file to the recipient computer.

An example 14 includes the subject matter of example 13, where the pre-processor performs any one or more of the following to create the output file: parsing the electronic file, pre-execution static analysis of the electronic file, extracting script components from the electronic file. An example 15 includes the subject matter of examples 13 or example 14, where the features includes any one or more of the following: an occurrence count, an occurrence frequency, metadata, a string of interest, a warning, a classification, a rule name. An example 16 includes the subject matter of any of examples 13-15, where the one or more sub-features of the electronic file includes any one or more of the following: a word, 128-byte data, a comment line, a line of code, a script, a page, a character, an edit, a version number, an image, a video, a color, a string of interest, an embedded object, an object identifier, a trailer object, a stream, an end of file (EOF) indicator, a variable, an xref tag, a startxref tag, a Uniform Resource Locators (URL), a metadata item, a version number, a file size, a decompiler message, a line of text. An example 17 includes the subject matter of any of examples 13-16, where the instructions, when executed by one or more processors, cause the one or more processors to perform operations including any one or more of the following: reducing the features using mutual information criteria, transforming the features to a floating point vector. An example 18 includes the subject matter of any of examples 13-17, where a model used by the machine learning-based classifier is created using any one or more of the following: a tree-based algorithm, a random forest algorithm, a deep learning algorithm, a neural network, a deep convolutional neural network. An example 19 includes the subject matter of any of examples 13-18, where the output file indicates that the electronic file contains Visual Basic for Application (VBA) code or programming code, and the features includes any one or more of the following: a word count, a 128-byte frequency, a 128 byte raw-count, a count of comment lines, a ratio of number of comment lines to code lines, a number of code lines, a length of document in characters, a count of VBA scripts, an average number of lines per VBA script, a largest number of lines per VBA script. An example 20 includes the subject matter of any of examples 13-19, where the output file indicates that the electronic file is a Rich Text Format (RTF) file or a word processor-created document file that does not contain programming code, and the features includes any one or more of the following: a page count, a word count, a character count, an editing time, a classification, a warning, a text entropy, an overall entropy, a document size, parse tree data, a rule name, an indicator priority, an indicator category. An example 21 includes the subject matter of any of examples 13-20, where the output file indicates that the electronic file is a Portable Document Format (PDF) file or an image file, and the features includes any one or more of the following: a version number, a number of colors, an occurrence count for a string of interest, a count of embedded objects, a minimum object identifier, a maximum object identifier, a trailer minimum size, a trailer maximum size, a count of trailer objects, a count of streams, a stream minimum size, a stream maximum size, a fraction of a file that is part of a stream, a total entropy, a non-stream entropy, a file size in bytes, a file size in bytes for non-stream parts, an end of file (EOF) count, a count for a top occurring variable, a count of xref tags, a count of startxref tags, a count of embedded Uniform Resource Locators (URLs), a top occurring metadata item. An example 22 includes the subject matter of any of examples 13-21, where the output file indicates that the electronic file is a Portable Document Format (PDF) file and the machine learning-based classifier is created using a neural network and the malware classification data is produced by inputting a single image of the electronic file to the machine learning-based classifier. An example 23 includes the subject matter of any of examples 13-22, where the output file indicates that the electronic file is a Flash file or a Small Web Format (SWF) file or a multimedia file, and the features includes any one or more of the following: a version number, a file size, a count of scripts, a count for a word of interest, a decompiler message, a line count, a character count, a 128 byte frequency, a 128 byte raw-count. An example 24 includes the subject matter of any of examples 13-23, the instructions, when executed by one or more processors, cause the one or more processors to perform operations including receiving the electronic file from a message transfer application on the network.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, from a pre-processor, an output file, the output file having been created by the pre-processor in response to input of an electronic file to the pre-processor, the electronic file being an attachment to an electronic mail message that is in-transit to a recipient computer on a network, the electronic file being a spreadsheet file, the output file containing features that are created by the pre-processor analyzing one or more sub-features of the electronic file, including one or more of: a sheet count of the spreadsheet file, a word count from cells of the spreadsheet file, a character count from words in the cells of the spreadsheet file, and text entropy from text in the cells of the spreadsheet file;

receiving, from a machine learning-based classifier, malware classification data that indicates whether the electronic file does or does not contain malware, the malware classification data being output by the machine learning-based classifier in response to the machine learning-based classifier determining that the features are or are not indicators of obfuscation, the data used to create the machine learning-based classifier including output files previously created by the pre-processor; and in response to the malware classification data matching a criterion, causing the network to modify, delay, or block transmission of the electronic file to the recipient computer.

2. The method of claim 1, wherein the pre-processor performs any one or more of the following to create the output file: parsing the electronic file, pre-execution static analysis of the electronic file, and extracting script components from the electronic file.

3. The method of claim 1, wherein the features comprises any one or more of the following: an occurrence count, an occurrence frequency, metadata, a string of interest, a warning, a classification, and a rule name.

4. The method of claim 1, further comprising:
performing one or more of the following: reducing the features using mutual information criteria and transforming the features to a floating point vector.

5. The method of claim 1, wherein a model used by the machine learning-based classifier is created using any one or more of the following: a tree-based algorithm, a random forest algorithm, a deep learning algorithm, a neural network, and a deep convolutional neural network.

6. The method of claim 1, the features comprising any one or more of: sheet count, word count from all cells, character count from all words in all cells, editing time, text entropy from all text in all cells, overall entropy from all text in all cells and all field types, occurrence count for strings of interest, and occurrence count for field types of interest.

7. The method of claim 1, comprising receiving the electronic file from a message transfer application on the network.

8. A computer program product comprising:
one or more non-transitory computer-readable storage media coupled to one or more processors, the one or more non-transitory computer-readable storage media storing instructions which, when executed by one or more processors, cause the one or more processors to perform operations comprising:
receiving, from a pre-processor, an output file, the output file having been created by the pre-processor in response to input of an electronic file to the pre-processor, the electronic file being an attachment to an electronic mail message that is in-transit to a recipient computer on a network, the electronic file being a spreadsheet file, the output file containing features that are created by the pre-processor analyzing one or more sub-features of the electronic file, including one or more of: a sheet count of the spreadsheet file, a word count from cells of the spreadsheet file, a character count from words in the cells of the spreadsheet file, and text entropy from text in the cells of the spreadsheet file;

receiving, from a machine learning-based classifier, malware classification data that indicates whether the electronic file does or does not contain malware, the malware classification data being output by the machine learning-based classifier in response to the machine learning-based classifier determining that the features are or are not indicators of obfuscation, the data used to create the machine learning-based classifier including output files previously created by the pre-processor; and in response to the malware classification data matching a criterion, causing the network to modify, delay, or block transmission of the electronic file to the recipient computer.

9. The computer program product of claim 8, wherein the pre-processor performs any one or more of the following to create the output file: parsing the electronic file, pre-execution static analysis of the electronic file, and extracting script components from the electronic file.

10. The computer program product of claim 8, wherein the instructions, when executed by the one or more processors, cause the one or more processors to perform operations comprising:
performing one or more of the following: reducing the features using mutual information criteria and transforming the features to a floating point vector.

11. The computer program product of claim 8, wherein a model used by the machine learning-based classifier is created using any one or more of the following: a tree-based algorithm, a random forest algorithm, a deep learning algorithm, a neural network, and a deep convolutional neural network.

12. The computer program product of claim 8, the features comprising any one or more of: sheet count, word count from all cells, character count from all words in all cells, editing time, text entropy from all text in all cells, overall entropy from all text in all cells and all field types, occurrence count for strings of interest, and occurrence count for field types of interest.

13. The computer program product of claim 8, the instructions, when executed by one or more processors, cause the one or more processors to perform operations comprising receiving the electronic file from a message transfer application on the network.

14. A computer-implemented method comprising:
receiving, from a pre-processor, a first output file, the first output file having been created by the pre-processor in response to input of a first electronic file to the pre-processor, the pre-processor creating the first output file by parsing and analyzing the first electronic file and extracting script components from the first electronic file, the first electronic file being a first attachment to a first electronic mail message that is in-transit to a first recipient computer on a network, the first output file containing features that are created by the pre-processor analyzing one or more sub-features of the first electronic file, the features comprising one or more of: an occurrence count, an occurrence frequency, metadata, a string of interest, a warning, a classification, and a rule name, and performing a feature reduction of a number of the features in the first output file by using mutual information criteria to merge a subset of the features that contain similar information;

receiving, from a machine learning-based classifier, malware classification data that indicates whether the first electronic file does or does not contain malware, the malware classification data being output by the machine learning-based classifier in response to the machine learning-based classifier determining that the features are or are not indicators of obfuscation, the data used to create the machine learning-based classifier including output files previously created by the pre-processor; and in response to the malware classification data matching a criterion, causing the network to modify, delay, or block transmission of the first electronic file to the recipient computer.

15. The method of claim 14, further comprising:

creating, by the pre-processor, a second output file based on input of a second electronic file, wherein the second output file indicates that the second electronic file contains Visual Basic for Application (VBA) code or programming code, wherein the second electronic file is a second attachment to a second message that is in-transit to a second recipient computer on the network, and wherein the second output file includes features that are created by the pre-processor analyzing one or more sub-features of the second electronic file, wherein the features comprises any one or more of the following: a word count, a 128 byte frequency, a 128 byte raw-count, a count of comment lines, a ratio of number of comment lines to code lines, a number of code lines, a length of document in characters, a count of VBA scripts, an average number of lines per VBA script, and a largest number of lines per VBA script;

receiving, from the machine learning-based classifier, malware classification data that indicates that the second electronic file includes malware; and causing the network to modify, delay, or block transmission of the second electronic file to the second recipient computer.

16. The method of claim 14, further comprising:

creating, by the pre-processor, a second output file based on input of a second electronic file, wherein the second output file indicates that the second electronic file is a Rich Text Format (RTF) file or a word processor-created document file that does not contain programming code, wherein the second electronic file is a second attachment to a second message that is in-transit to a second recipient computer on the network, and wherein the second output file includes features that are created by the pre-processor analyzing one or more sub-features of the second electronic file, wherein the features comprises any one or more of the following: a page count, a word count, a character count, an editing time, a classification, a warning, a text entropy, an overall entropy, a document size, parse tree data, a rule name, an indicator priority, and an indicator category;

receiving, from the machine learning-based classifier, malware classification data that indicates that the second electronic file includes malware; and causing the network to modify, delay, or block transmission of the second electronic file to the second recipient computer.

17. The method of claim 14, further comprising:

creating, by the pre-processor, a second output file based on input of a second electronic file, wherein the second output file indicates that the second electronic file is a Portable Document Format (PDF) file or an image file, wherein the second electronic file is a second attachment to a second message that is in-transit to a second recipient computer on the network, and wherein the second output file includes features that are created by the pre-processor analyzing one or more sub-features of the second electronic file, wherein the features comprises any one or more of the following: a version number, a number of colors, an occurrence count for a string of interest, a count of embedded objects, a minimum object identifier, a maximum object identifier, a trailer minimum size, a trailer maximum size, a count of trailer objects, a count of streams, a stream minimum size, a stream maximum size, a fraction of a file that is part of a stream, a total entropy, a non-stream entropy, a file size in bytes, a file size in bytes for non-stream parts, an end of file (EOF) count, a count for a top occurring variable, a count of xref tags, a count of startxref tags, a count of embedded Uniform Resource Locators (URLs), and a top occurring metadata item;

receiving, from the machine learning-based classifier, malware classification data that indicates that the second electronic file includes malware; and causing the network to modify, delay, or block transmission of the second electronic file to the second recipient computer.

18. The method of claim 14, further comprising:

creating, by the pre-processor, a second output file based on input of a second electronic file, wherein the second output file indicates that the second electronic file is a Portable Document Format (PDF) file, wherein the second electronic file is a second attachment to a second message that is in-transit to a second recipient computer on the network, and wherein the second output file includes features that are created by the pre-processor analyzing one or more sub-features of the second electronic file, wherein the machine learning-based classifier is created using a neural network and the malware classification data is produced by inputting a single image of the electronic file to the machine learning-based classifier;

receiving, from the machine learning-based classifier, malware classification data that indicates that the second electronic file includes malware; and causing the network to modify, delay, or block transmission of the second electronic file to the second recipient computer.

19. The method of claim 14, further comprising:

creating, by the pre-processor, a second output file based on input of a second electronic file, wherein the second output file indicates that the second electronic file is a Flash file or a Small Web Format (SWF) file or a multimedia file, wherein the second electronic file is a second attachment to a second message that is in-transit to a second recipient computer on the network, and wherein the second output file includes features that are created by the pre-processor analyzing one or more sub-features of the second electronic file, wherein the features comprises any one or more of the following: a version number, a file size, a count of scripts, a count for a word of interest, a decompiler message, a line count, a character count, a 128 byte frequency, and a 128 byte raw-count;

receiving, from the machine learning-based classifier, malware classification data that indicates that the second electronic file includes malware; and causing the network to modify, delay, or block transmission of the second electronic file to the second recipient computer.

* * * * *